(12) United States Patent
Fischer et al.

(10) Patent No.: US 8,784,516 B2
(45) Date of Patent: *Jul. 22, 2014

(54) PROCESS FOR THE PRODUCTION OF HYDROGEN WITH INTERMEDIATE-PRESSURE PURGING

(75) Inventors: Beatrice Fischer, Lyons (FR); Fabrice Giroudiere, Orlienas (FR); Jean-Louis Ambrosino, Ternay (FR); Michel Thomas, Lyons (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 550 days.

This patent is subject to a terminal disclaimer.

(21) Appl. No.: 13/187,844

(22) Filed: Jul. 21, 2011

(65) Prior Publication Data
US 2012/0017511 A1 Jan. 26, 2012

(30) Foreign Application Priority Data

Jul. 23, 2010 (FR) ...................................... 10 03089

(51) Int. Cl.
*C01B 3/24* (2006.01)

(52) U.S. Cl.
USPC ............ 48/198.3; 48/61; 48/127.9; 48/127.1; 48/128; 48/198.1; 48/197 R; 48/198.7; 422/625; 422/630

(58) Field of Classification Search
USPC ........ 48/61, 127.9, 127.1, 197 R, 128, 198.1, 48/198.7, 198.3; 422/625, 630; 95/90–148; 96/108–154
See application file for complete search history.

(56) References Cited

U.S. PATENT DOCUMENTS

| 4,475,929 | A | * | 10/1984 | Fuderer | ............................... 95/97 |
| 5,203,888 | A | * | 4/1993 | Maurer | ............................ 95/101 |
| 5,753,010 | A | * | 5/1998 | Sircar et al. | ........................ 95/45 |
| 6,103,143 | A | * | 8/2000 | Sircar et al. | .................... 252/373 |
| 6,521,143 | B1 | | 2/2003 | Genkin et al. | |
| 7,752,848 | B2 | | 7/2010 | Balan et al. | |
| 2003/0000385 | A1 | * | 1/2003 | Kawai et al. | ...................... 95/96 |
| 2003/0191196 | A1 | | 10/2003 | Madhubhai et al. | |

(Continued)

FOREIGN PATENT DOCUMENTS

| EP | 1146009 A1 | 10/2001 |
| EP | 1582502 A1 | 3/2005 |
| EP | 2168913 A1 | 3/2010 |

OTHER PUBLICATIONS

Search Report, dated Dec. 9, 2010, issued in corresponding FR 1003089.

*Primary Examiner* — Kaity Handal

(74) *Attorney, Agent, or Firm* — Millen, White, Zelano & Branigan, P.C.

(57) ABSTRACT

This invention relates to a process for the production of hydrogen from a hydrocarbon feedstock and water vapor comprising:

A stage for the production of a synthetic gas in a vapor reforming unit of the hydrocarbon feedstock in the presence of water vapor, with a fuel that provides the heat that is necessary to the reaction, A stage for conversion to vapor of the synthetic gas that is obtained in the preceding stage producing a hydrogen stream that contains methane and carbon dioxide, A stage for recovering carbon dioxide that is present in the stream that is obtained in the stage for conversion to vapor, making it possible to separate the carbon dioxide from the hydrogen stream, A stage for recovery and recycling to the vapor reforming stage of impurities that are present in the hydrogen stream, comprising a decompression phase.

13 Claims, 3 Drawing Sheets

(56) References Cited

U.S. PATENT DOCUMENTS

| | | | |
|---|---|---|---|
| 2004/0025692 A1* | 2/2004 | Sumida et al. | 95/96 |
| 2010/0037521 A1 | 2/2010 | Vakil et al. | |
| 2010/0080754 A1 | 4/2010 | Fischer et al. | |
| 2010/0196259 A1* | 8/2010 | Garg et al. | 423/651 |

* cited by examiner

PROCESS FOR THE PRODUCTION OF HYDROGEN WITH INTERMEDIATE-PRESSURE PURGING

This invention relates to the field of the production of hydrogen and more particularly a process for the production of hydrogen with total recovery of $CO_2$, recycling of unconverted methane and intermediate purging.

Global warming of the planet, observed since the industrial era according to the international scientific community, could dramatically modify the climates and ecosystems of numerous regions of the globe. Emission of greenhouse gas and especially carbon dioxide ($CO_2$) seems to be responsible for this warming.

Fossil energy (natural gas, petroleum, carbon) constitutes a large part of the energy that is readily available on the planet. This fossil energy, however, when it is used, produces $CO_2$ (generally during a combustion stage) and is thus implicated in global warming.

One of the solutions that is recommended for fighting against global warming by greenhouse gas emissions is to recover the $CO_2$ that is produced and then to store it underground. Several methods are explored, including recovery by precombustion that consists in converting fossil energy into hydrogen with recovery and storage of the $CO_2$ that is co-produced. Hydrogen, an energy vector, can then be burned freely with no greenhouse gas emissions.

There are currently several means for producing hydrogen industrially based on fossil energy. The most widely used means is the vapor reforming of natural gas that is implemented in a furnace (in English: SMR: Steam Methane Reforming) that offers the advantage of using a feedstock that has a high hydrogen/carbon ratio, taking into account the high methane content in its composition. In a simplified way, the SMR catalytic reaction can be written in the following manner:

$$CH_4 + H_2O \leftrightarrow CO + 3H_2$$

This very endothermic reaction is balanced. It is promoted by high temperatures and is carried out in general in a furnace that is heated by a fuel such as natural gas. The SMR unit is conventionally followed by a vapor conversion stage (WGS: Water Gas Shift) that makes it possible to maximize the production of hydrogen by the following reaction:

$$CO + H_2O \leftrightarrow CO_2 + H_2$$

When it is necessary to recover $CO_2$ for the purpose of storing it, it is then possible to use an amine washing unit (MDEA in combination with another amine, for example) that will extract the $CO_2$ from the hydrogen-rich stream, which is then sent, for example, into a gas turbine for the purpose of producing electricity, while the $CO_2$ will be compressed and sent back under ground.

In this type of process, the objective of recovering $CO_2$ is not fully achieved, because not only does $CO_2$ still remain at the output of the turbine because of the presence of methane, CO and $CO_2$ that are still present in the hydrogen, but more natural gas is necessary at the input than if it were sent directly into the turbine. In addition, the furnace in which the vapor reforming is implemented uses natural gas and therefore emits a lot of $CO_2$. The $CO_2$ avoidance level is therefore low.

An improvement to this technique consists in adding a pressure-modulated impurity adsorption unit (PSA). At this time, two streams are obtained: a 99.99% pure hydrogen stream, and a stream of impurities containing at least 20% hydrogen. This low-pressure stream is sent into the burners of the vapor reforming furnace, which reduces the natural gas that is necessary for the furnace, and therefore the production of $CO_2$. However, the $CO_2$ avoidance level remains low, since, on the one hand, the impurities will exit in the form of $CO_2$ into the flue gases of the furnace, and, on the other hand, it is necessary to produce more hydrogen, and therefore to use more natural gas for the vapor reforming feedstock.

Another improvement described in the patent application FR 2 936 507 consists in replacing the adsorption unit on a molecular sieve by an adsorption unit that can be, for example, on activated carbon or any other adsorbent solid. This adsorption unit consists of at least two adsorbers. The adsorption cycle in the adsorption unit consists of several adsorption phases comprising at least the following successive phases: adsorption of the impurities from the hydrogen-rich gas stream that is to be purified on a first adsorber, regeneration of the first adsorber with recycling of hydrogen, and adsorption of impurities on a second adsorber and so on if there are more than two adsorbers.

The disadvantage of this solution is linked to the recycling of a large quantity of hydrogen. Actually, according to Le Chatelier's Principle, this point does not promote the reaction in the forward direction of vapor reforming by the presence of a product of the reaction and therefore leads to increasing the size of the set of equipment of the chain for manufacturing the synthetic gas and of the amine separation unit.

This invention therefore has as its object to remedy one or more of the disadvantages of the prior art by proposing a process for the production of hydrogen that makes it possible to recover the impurities that are present at the end of production, and in particular methane, and to recycle them to the vapor reforming stage without a loss of energy.

For this purpose, this invention proposes a process for the production of hydrogen based on a hydrocarbon feedstock and water vapor comprising:
  A stage for the production of a synthetic gas in a unit for vapor reforming the hydrocarbon feedstock in the presence of water vapor, with a fuel that provides the heat that is necessary to the reaction,
  A stage for conversion to vapor of the synthetic gas that is obtained in the preceding stage producing a hydrogen stream that contains methane and carbon dioxide,
  A stage for recovery of carbon dioxide that is present in the stream that is obtained in the vapor conversion stage, making it possible to separate the carbon dioxide from the hydrogen stream,
  A stage for recovery and recycling to the vapor reforming of impurities that are present in the hydrogen stream, comprising a decompression phase.

According to one embodiment of the invention, the stage for recovery and recycling of impurities is carried out in an adsorption unit that comprises at least two adsorbers and comprises at least the following successive stages:
  Adsorption of impurities on the first adsorber,
  Decompression and regeneration of the first adsorber,
  Adsorption of impurities on the second adsorber.

According to an embodiment of the invention, the decompression phase is carried out at a pressure of between 0.2 MPa and 1.4 MPa.

According to an embodiment of the invention, the decompression phase is carried out at a temperature of between 20° C. and 100° C.

According to an embodiment of the invention, the decompression phase is carried out at a speed of between 0.05 MPa per minute and 2 MPa per minute.

According to one embodiment of the invention, the decompression phase produces a hydrogen stream that is burned in the vapor reforming unit.

According to one embodiment of the invention, the phase for decompression and regeneration of the adsorber is carried out in the following way:

Isolation of the first adsorber and putting the second adsorber on line,

Decompression of the first adsorber, recompression and flushing of the first adsorber, with a hydrocarbon feedstock stream that is designed to serve as feedstock in the vapor reforming unit, and heated by exchange with the water vapor that is also intended for the vapor reforming unit, up to a temperature that is greater by at least 20° C. than the condensation temperature of the water vapor, Regeneration of the reheated adsorber and desorption of impurities by circulation of water vapor that is superheated by at least 20° C. intended for the vapor reforming unit, Elimination of the water vapor that is present in the adsorber that is regenerated by a flushing of the adsorber with a pure and hot hydrogen stream, Flushing of the adsorber from which water vapor is removed by a pure and cold hydrogen stream.

According to one embodiment of the invention, the decompression phase produces a hydrogen stream that is sent in a mixture with a portion of a hydrogen stream that is hot and saturated with water vapor, obtained after flushing with the regenerated adsorber, which is burned in the vapor reforming unit.

According to one embodiment of the invention, at the end of the elimination of the water vapor, a portion of the hydrogen stream that is hot and saturated with water vapor that is obtained is sent, which is burned in the reforming unit, and the other portion of the stream is sent in a mixture with the dilution water vapor to a gas turbine for producing electricity.

According to another embodiment of the invention, at the end of the elimination of the water vapor, a portion of the hydrogen stream that is obtained after the regenerated adsorber is flushed is sent to an outside unit, while the rest of the hydrogen is used for the hot flushing, and then sent to the burners of the reforming unit.

According to one embodiment of the invention, at the end of the flushing with the cold hydrogen, the stream of reheated hydrogen that is obtained after the phase for cooling the adsorber is again heated by exchange with the water vapor and used in the phase for elimination of the water vapor that is present in the adsorber.

According to one embodiment of the invention, the hydrocarbon feedstock is natural gas.

According to one embodiment of the invention, the adsorbed impurities are methane, carbon dioxide, and carbon monoxide.

According to one embodiment of the invention, the stage for the production of the synthetic gas is carried out at a pressure of between 2.5 MPa and 3.5 MPa.

According to one embodiment of the invention, the stage for recovery of carbon dioxide is carried out in an amine unit that uses methyl diethylamine and at least one other amine.

Other characteristics and advantages of the invention will be better understood and will emerge more clearly from reading the description that is given below by referring to the accompanying figures that are provided by way of example:

Figure 1:
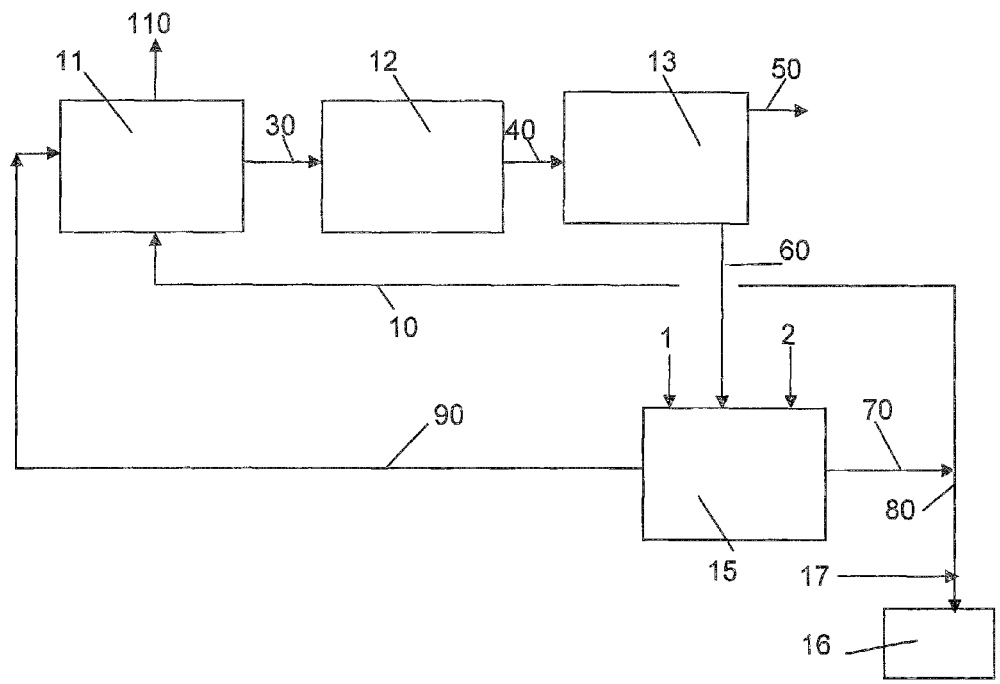
FIG. 1 shows a diagram of the process for the production of hydrogen according to the prior art.
Figure 2:
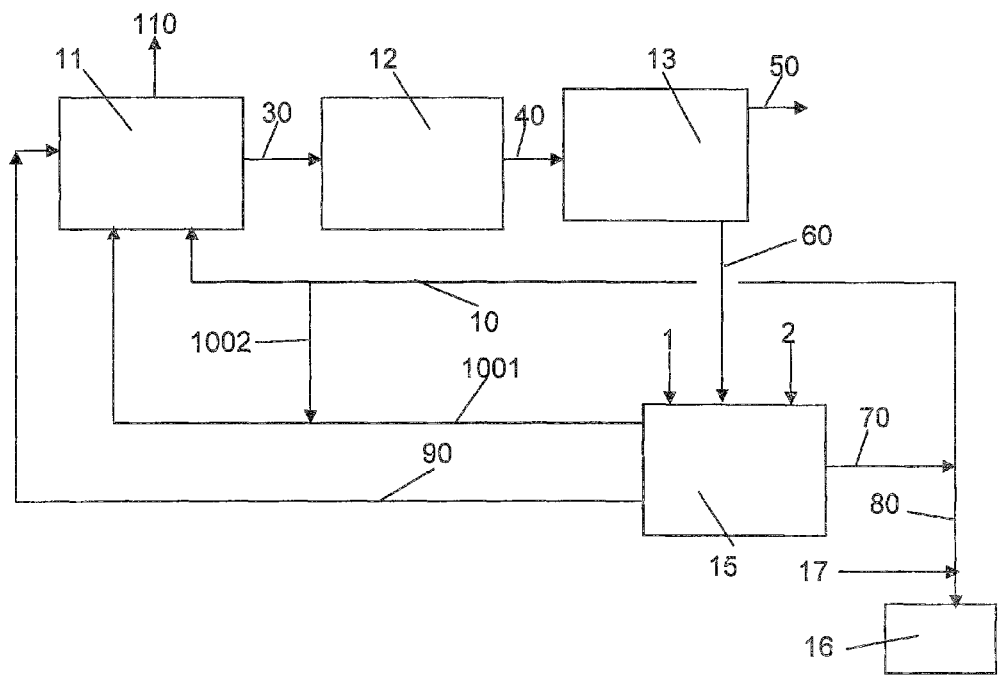
FIG. 2 shows a diagram of the process for the production of hydrogen according to the invention.

During the process for the production of hydrogen, illustrated in FIGS. 1 and 2, a stream of natural gas that circulates in a feedstock pipe (1) that comes into the adsorption unit (15) and a stream of water vapor that circulates in a water vapor pipe (2) that comes into the adsorption unit (15) are sent indirectly as feedstock into a vapor reforming unit (11). The heat that is necessary to the reaction is produced by a fuel stream that comes in via a pipe (10) into the vapor reforming unit (11), into the vapor reforming furnace. The fuel can be natural gas. At the output of the furnace (11), this reaction produces a stream of flue gases that contain a little carbonic gas. The stream of synthetic gas that circulates in a pipe (30) of synthetic gas that ranges from the vapor reforming unit (11) to the vapor conversion unit (12), obtained by the vapor reforming reaction, primarily contains hydrogen ($H_2$), carbon monoxide (CO), carbon dioxide ($CO_2$), as well as water vapor ($H_2O$), and a small amount of methane that has not reacted ($CH_4$), because the reaction is balanced, and even at a temperature of 900° C., approximately 4% methane that has not reacted remains. This stream of synthetic gas is sent via the synthetic gas pipe (30) to the vapor conversion unit (12). In this unit, the bulk of the carbon monoxide is converted into carbon dioxide using water vapor, releasing a little more hydrogen at the same time. This reaction is also balanced, and there is ultimately a little carbon monoxide (0.5% under intense conversion conditions). At the output of the conversion unit (12), the conversion stream that is obtained, circulating in a conversion stream pipe (40) that connects the conversion unit (12) and the $CO_2$ recovery unit (13), essentially contains hydrogen and carbon dioxide. This stream that circulates in the conversion stream pipe (40) also contains a small amount of methane and carbon monoxide, with the rest of the water vapor having been condensed after the vapor conversion reactors.

The conversion stream is then sent to a $CO_2$ recovery unit (13), which can be an amine unit, and, for example, an amine unit that uses methyl diethylamine (MDEA) in combination with at least one other amine is particularly suitable. It is possible to use other $CO_2$ recovery units that are well-known to one skilled in the art.

The essential portion of $CO_2$ is separated and sent via a $CO_2$ pipe (50) to a compression and drying unit to then be transported to a reinjection site such as a played-out deposit or a suitable geological layer.

The hydrogen-rich gas is evacuated via another hydrogen-rich gas pipe (60) that connects the $CO_2$ recovery unit (13) and the adsorber unit (15). This gas comprises a small amount of methane, carbon monoxide, and a small amount of unrecovered carbon dioxide (approximately 0.5%).

In the process according to the invention, this hydrogen-rich gas is directed to the unit for adsorption on activated carbon (15).

In the adsorption unit (15) that is used in the process according to the invention, which can therefore be, for example, on activated carbon or any other adsorbent solid and, for example, such as those described in the following examples, the regeneration is done at high pressure by water vapor that is brought in via the water vapor pipe (2). This water vapor is then used as a feedstock of the vapor reforming unit that is brought in by the vapor reforming feedstock pipe (90) that connects the adsorption unit (15) and the vapor reforming unit (11). In this way, the impurities ($CH_4$, CO, $CO_2$) are recycled in the vapor reforming reactor. To minimize the $CO_2$ that is emitted by the vapor reforming furnace, a portion of the hydrogen that is produced and that exits via the hydrogen pipe (70) into the vapor reforming unit (11) is used. A portion of the hydrogen that is obtained from the pipe (70) is therefore sent to the burners of the vapor reforming unit (to be burned there) via the pipe (10) in such a way that the flue gases that exit via the pipe (110) do not comprise $CO_2$. The rest of the hydrogen is sent via the pipe (80) to the gas turbine (16) in a mixture with the dilution water vapor that comes in via the dilution water vapor pipe (17). In this configuration, the $CO_2$ avoidance level may be close to 100%.

The burners of the vapor reforming unit (11) are also fed by pure hydrogen at high pressure that originates from the adsorption unit (15). This hydrogen is the result of a decompression or depressurization phase that is carried out in the adsorption unit (15) and described below. This supply of hydrogen is done by means of the depressurization pipe (1001) that starts from the adsorption unit (15) and comes into the vapor reforming unit (11). If necessary, the flow rate of the line (1001) can be made up with the hydrogen that comes in from the pipe (10) by means of the pipe (1002) that connects the heat pipe (10) to the depressurization pipe (1001).

Figure 3:
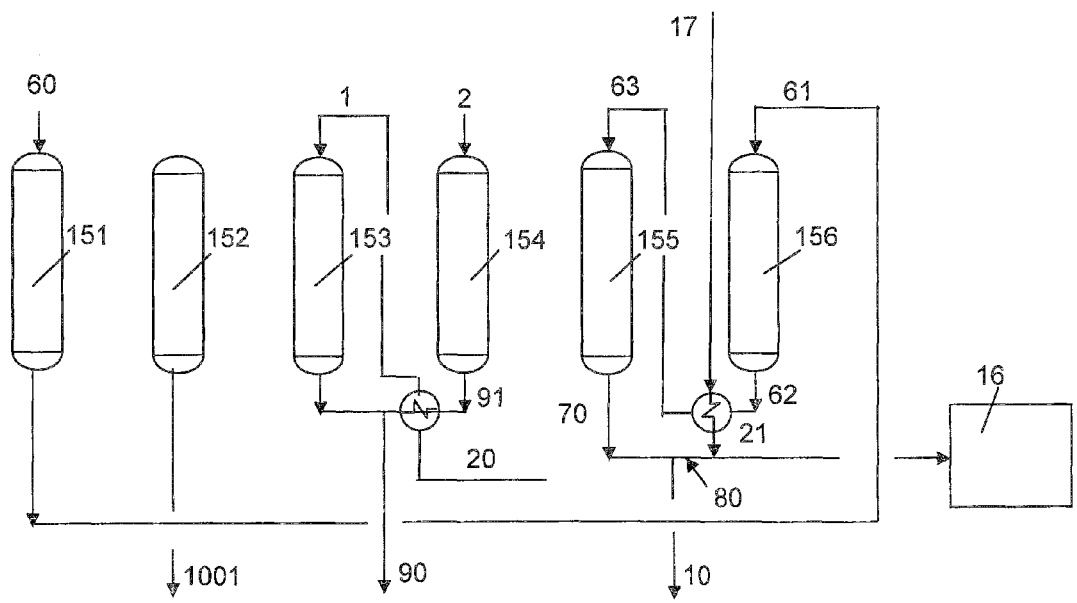
FIG. 3 shows in detail the adsorption unit of the diagram for the production of hydrogen according to the invention.

The adsorption unit (15) that is used in this invention consists of several adsorbers, also called capacitors (151 to 156). The mode of operation is illustrated in FIG. 3 in a configuration with 6 adsorbers, a non-limiting configuration. A different number of capacitors is obviously possible without exceeding the scope of this invention, and, for example, 1 to 18, and preferably 5 to 12, but we are limited to 6 to be able to explain the invention more simply. This adsorption unit (15) is supplied with feedstock methane, necessary for subsequent purging and pressurization phases, via the feedstock pipe (1).

According to the invention, the stage for desorption of impurities that are present in hydrogen and adsorbed on the solid is carried out by the superheated water vapor. The adsorbent solid is to be capable of withstanding high temperatures, typically between the ambient temperature and 350° C., in the presence of superheated water vapor. According to the invention, the adsorbent will be selected by the adsorbents such as activated carbons or carbon molecular sieves.

Among the group of activated carbons, the activated carbons that have been prepared by physical activation with vapor rather than by chemical activation with, for example, acid, will preferably be selected. The activation conditions are actually stricter than those encountered under the conditions of the invention, in particular for the temperature that is generally between 600 and 900° C.

An activated carbon that essentially contains micropores, whose diameter is typically less than 2 nm, and macropores, whose diameter is greater than 50 nm, and the smallest possible quantity of mesopores (diameters of between 2 and 50 nm) will preferably be selected. These diameters can be calculated based on nitrogen adsorption isotherms at 77 K according to, for example, the BJH (Barrett-Joyner-Halenda) method (field of mesopores), well known to one skilled in the art, and mercury intrusion curves according to Washburn's Law (field of macropores), also well known to one skilled in the art.

The reason for such a selection is explained by the fact that the water vapor that is present in the adsorbent bed can lead to the capillary condensation phenomenon in the mesopores of activated carbon, in particular if the temperature of the superheated vapor decreases considerably until reaching the dew point of the pressure being considered. With the relative pressure of the water vapor being able to give rise to this capillary condensation phenomenon in the mesopores can be calculated according to the Kelvin equation by using the parameters relative to water [sic]. On this subject, reference can usefully be made, for example, to the works by S. J. Gregg and K. S. W. Sing (Adsorption, Surface Area and Porosity) and by J. Rouquérol et al. (Adsorption by Powders and Porous Solids).

The activated carbons that are used within the scope of the invention will be shaped, in the form, for example, of granules, whose diameter is, for example, between 0.5 and 5 mm, of extrudates, whose length is approximately 0.5 to several mm, or said carbons will be shaped in crushed form of several millimeters of characteristic dimensions.

The micropore volume of the activated carbons will be between, for example, 0.05 and 0.80 cm3/g, determined by, for example, nitrogen adsorption at 77 K by the t-plot method, or according to the Dubinin equation and its variants.

The mesopore volume will preferably be between 0.05 and 0.30 cm3/g, determined by nitrogen adsorption at 77 K at a relative pressure of P/PO that is close to 0.98-0.99, minus the micropore volume.

The macropore volume will preferably be between 0.10 and 0.50 cm3/g, determined by mercury intrusion.

As an example of activated carbons responding to this criterion, it is possible, for example, to cite the activated carbon AC35/3, Ceca/Arkema, the activated carbons PicaCarb E460-E, and Picactif TA60 or TA90, of Pica Carbon.

The adsorption cycle in the adsorption unit (15) consists of several phases. The six capacitors (151 to 156), illustrated in FIG. 3, are filled with adsorbent. The stream of hydrogen-rich gas that is to be purified and that comes in via the pipe (60) is sent into the first capacitor (151) at a temperature of between 20 and 100° C., preferably between 40° C. and 80° C., and in a very preferred manner between 30° C. and 70° C. The methane, CO and $CO_2$ contained in this stream are recovered on the adsorbent, and the purified hydrogen exits via the pipe (61). The hydrogen, circulating in the pipe (61) connecting the first capacitor (151) to the sixth capacitor (156), is then sent into the sixth capacitor (156) in such a way as to cool it to the operating temperature that is between 20° C. and 100° C. The reheated hydrogen exits from the sixth capacitor via the pipe (62) that connects the sixth capacitor (156) and a heat exchanger (21) and is sent to a heat exchanger (21) to again be reheated by exchange with dilution water vapor coming in via the dilution water vapor pipe (17). The hot hydrogen exits from the heat exchanger (21) via the hot hydrogen pipe (63) that connects the heat exchanger (21) to a fifth capacitor (155) at a temperature that is at least greater by 20° C. than the condensation temperature of the water vapor at operating pressure. The hot hydrogen that is brought into the fifth capacitor (155) via the pipe (63) makes it possible to evacuate the remaining water vapor in the capacitor after the regeneration stage. This water vapor is sent in a mixture with hydrogen in part toward the vapor reforming furnace burners via the pipe (10) and in part toward the gas turbine (16) via the pipe (80). According to one variant of the invention, a portion of the hydrogen that circulates in the pipe (62) can be sampled at the outlet of the sixth capacitor (156), cooled by a heat exchanger using cooling water or air, and compressed by a compressor. There is thus a stream of pure hydrogen that is sent, for example, to an outside unit to outside users. The rest of the hydrogen from the pipe (62) is heated by the exchanger (21) before flushing the fifth capacitor (155), exits via the pipe (70) that connects the fifth capacitor (155) to the gas turbine (16), is next mixed with the dilution water vapor (17), cooled by the exchanger (21), and is sent as fuel toward the vapor reforming unit (11), for example, a vapor reforming furnace, via the pipe (10).

The fourth capacitor (154) is flushed by the water vapor that is brought in via the water vapor pipe (2). The water vapor that is charged with methane and $CO_2$ is evacuated from the fourth capacitor (154) via the pipe (91) that connects the third capacitor (153) to a heat exchanger (20), is slightly cooled in this second heat exchanger (20) by exchange with the natural gas that comes in via the pipe (1), and then mixed with the natural gas that comes from the third capacitor (153), to then be sent via the vapor reforming feedstock pipe (90) to the vapor reforming unit (11).

The third capacitor (153) is first brought to the pressure of the natural gas that is approximately 3.5 MPa, and then it is gradually reheated by flushing by hot natural gas (250° C. to 350° C.) coming in via the pipe (1) after being preheated by exchange with the water vapor that is brought in via the pipe (91).

The invention consists in depressurizing the second capacitor (152), during the preceding stages, using the depressurization pipe (1001). The hydrogen that circulates in the pipe (1001) is then sent to the burners at medium and/or low pressure of the furnaces that are used to provide the energy that is necessary to the vapor reforming unit (11). By carrying out this sequence at an intermediate pressure between the adsorption pressure and the pressure of the burners, it is possible to evacuate primarily the hydrogen that is present in the adsorbent bed. During this sequence, portions of the other components such as methane, ethane, a small amount of CO and water vapor are also extracted and represent less than 10 mol % in this stream. The light hydrocarbons are obtained both from the gas that is imprisoned between the adsorbent grains in each capacitor and the partial desorption of gases such as methane because of a modification of the partial pressure.

The hydrogen that circulates in the pipe (1001) can also be sent to the burners at medium and/or low pressure of the furnaces that are used to provide the energy that is necessary to the vapor reforming unit (11) in a mixture with a portion of the hot hydrogen stream and saturated with water vapor that is obtained after flushing of the regenerated adsorber and that circulates in the pipe (70).

Figure 4:
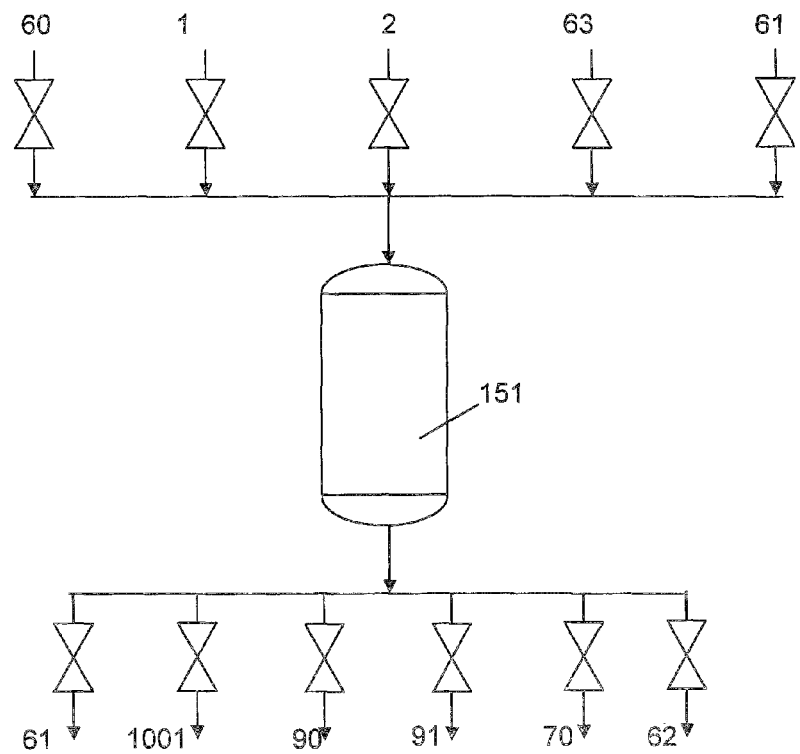
FIG. 4 shows in detail a portion of the adsorption unit of the diagram for the production of hydrogen according to the invention.

FIG. 4 shows one of the capacitors or adsorbers, for example the first (151) that contains the adsorbent substance that may be activated carbon. The pipes (60, 1, 2, 63, and 61), respectively bringing in the hydrogen to be purified, the natural gas, the water vapor, hot pure hydrogen, and cold pure hydrogen, are connected to the capacitor with valves that make it possible to isolate each of the circuits. The pipes (61, 1001, 90, 91, 70 and 62)—respectively evacuating cold pure hydrogen, hydrogen that originates from the depressurization stage, methane to the vapor reforming unit, water vapor to the vapor reforming unit, pure hydrogen that is saturated with water vapor, and pure hydrogen, are also connected to the capacitor with isolating valves.

For the purpose of simplification, this figure shows the intake of all of the top inputs of the capacitor and all of the bottom outputs, but this is only one of the possibilities, and all of the other configurations are possible without exceeding this invention.

Figure 5:
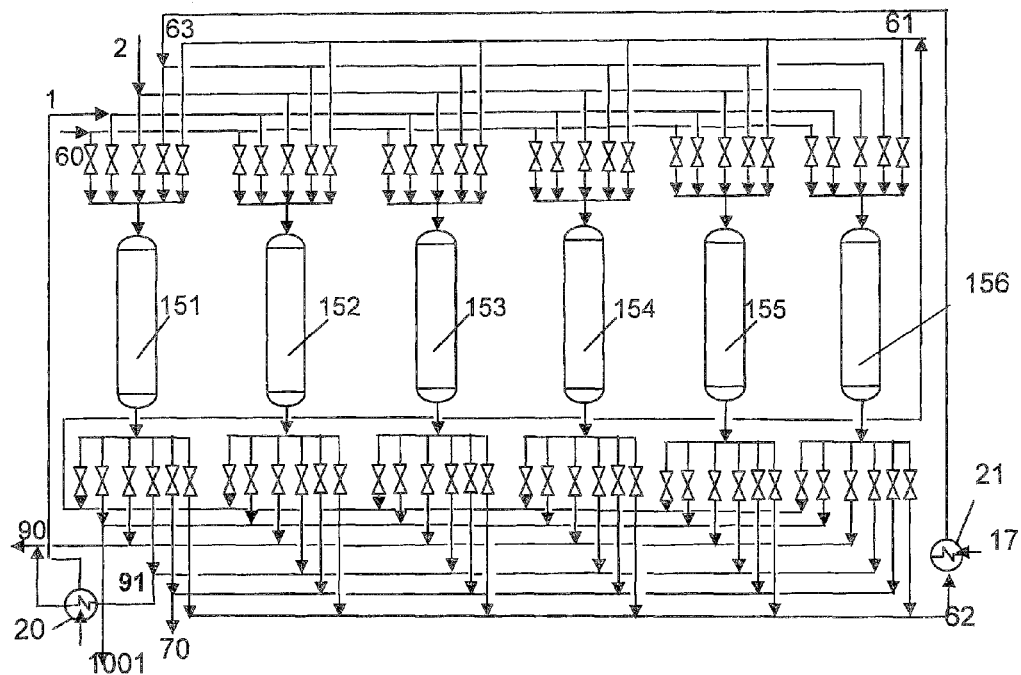
FIG. 5 shows a variant of the diagram of the process according to the invention.

FIG. 5 shows the arrangement of six capacitors or adsorbers in parallel (151, 152, 153, 154, 155 and 156) that allow a continuous operation of the installation. In this case, a different number of capacitors is also obviously possible without exceeding the scope of this invention, but we are limited to 6 for being able to explain the invention in detail more simply.

During the first phase of operation of the adsorption cycle, the first capacitor (151) receives cold and impure hydrogen via the pipe (60), retains the various impurities on the adsorbent, and the pure hydrogen exits via the pipe (61). The second capacitor (152) is depressurized. The third capacitor (153) has just been withdrawn from the circuit and enters into regeneration. In a first step, there is pressurization by the hot methane that comes in via the pipe (1), and then the adsorbent is heated by methane to a temperature of between 250° C. and 350° C. where the water vapor that is next used for the regeneration does not run the risk of condensing (water vapor pressure at 2.5 MPa at approximately 225° C., and at 3.5 MPa at approximately 245° C.). The methane at the adsorbent output is sent via the pipe (90) to the vapor reforming unit.

During this first phase, the fourth capacitor (154) is in regeneration: the superheated water vapor is fed via the pipe (2); it makes it possible to desorb the methane, CO and $CO_2$ present on the adsorbent. The mixture of water vapor, methane and impurities will be sent to the vapor reforming unit via the pipe (91), in a mixture with the methane that comes from the third capacitor (153).

The fifth capacitor (155) is purged of water vapor due to the circulation of pure and hot hydrogen brought in via the pipe (63) and returned via the pipe (70). The sixth capacitor (156) is cooled by pure and cold hydrogen brought in via the pipe (61), whereby the pure hydrogen is returned via the pipe (62).

During the following phase, the first capacitor (151) is depressurized. The second capacitor (152) moves on to pressurization and heating; the third capacitor (153) is regenerating; the fourth capacitor (154) is purging; the fifth capacitor (155) is cooling, and the sixth capacitor (156) is on line to the hydrogen to be purified.

During the third operating phase, the first capacitor (151) moves on to pressurization and heating and the second capacitor (152) to regeneration; the third capacitor (153) is purging; the fourth capacitor (154) is cooling; the fifth capacitor (155) is purifying hydrogen, and the sixth capacitor (156) is depressurized.

During the fourth operating phase, the first capacitor (151) is regenerating; the second capacitor (152) moves on to purging; the third capacitor (153) is cooling; the fourth capacitor (154) is purifying hydrogen; the fifth capacitor (155) is depressurizing, and the sixth capacitor (156) is pressurizing and heating by methane.

During the fifth operating phase, the first capacitor (151) is purging; the second capacitor (152) is cooling; the third capacitor (153) is purifying hydrogen; the fourth capacitor (154) is depressurizing; the fifth capacitor (155) is pressurizing and heating by methane, and the sixth capacitor (156) moves on to regeneration by circulation of water vapor.

During the sixth phase, the first capacitor (151) is cooling; the second capacitor (152) is purifying hydrogen; the third capacitor (153) is depressurizing; the fourth capacitor (154) is pressurizing and heating by methane; the fifth capacitor (155) moves on to regeneration by circulation of water vapor, and the sixth capacitor (156) is purging.

The complete cycle is finished, and the following phase is similar to the first.

The operating conditions as well as the composition of the different streams during the process are summed up in Table A below, in the case of, for example, vapor reforming operating at 3.3 MPa.

TABLE A

| Stream No. | Composition | Pressure (MPa) | Temperature (°C.) |
|---|---|---|---|
| 1 | Natural Gas (Primarily $CH_4$) | 3.5 | 300 (After Preheating) |
| 2 | $H_2O$ | 3.5 | 350 |
| 60 | $H_2$, $CH_4$, $H_2O$, $\epsilon CO$, $\epsilon CO_2$ | 2.6 | 62 |
| 1001 | $H_2$, $CH_4$, $H_2O$, $\epsilon CO$, $\epsilon CO_2$ | 0.7 | 62 |
| 61 | $H_2$ | 2.5 | 62 |
| 62 | $H_2$ | 2.5 | 62-300 |
| 63 | $H_2$ | 2.5 | 300 |
| 70 | $H_2 + H_2O$ | 2.5 | 300 |
| 90 | $CH_4$, $H_2O$, $\epsilon CO$, $\epsilon CO_2$ | 3.4 | 320 |

The process, object of the invention, therefore makes it possible to recover the impurities that are present ($CH_4$, CO, $CO_2$) in the hydrogen-rich stream (exiting from the amine washing) and to return them under pressure with the vapor reforming feedstock. It can be summarized in the manner described below.

This process, which is cyclic, uses several capacitors and comprises at least the following successive stages:

Stage 1: Adsorption of methane, CO and $CO_2$ in the hydrogen-rich stream on an adsorbent of one capacitor. This stage takes place at low temperature between 20 and 100° C., preferably between 40° C. and 80° C., and in a very preferred manner between 30° C. and 70° C.; the pressure is between 1 and 10 MPa, preferably between 2 and 8 MPa, and very preferably between 1.5 and 4 MPA. The velocity of the gas is between 0.5 and 20 m/min, and preferably between 1 and 10 m/min. The duration of the adsorption phase is between 1 and 60 minutes, preferably between 1 and 30 minutes, and preferably between 1 and 15 minutes. The hydrogen exits in pure form from this stage. The adsorbent can, for example, be activated carbon. This stage is preferably carried out by operating from bottom to top (upflow in English terminology) so as to limit the risk of wetting the adsorbents of finishes located on the upper portion. This can allow the evacuation of water if necessary by gravity at the bottom of the adsorber.

Stage 2: Depressurization of the capacitor when the adsorbent is saturated. This decompression or depressurization stage is carried out up to a low pressure that is between 0.2 MPa and 1.4 MPa and preferably between 0.4 MPa and 1 MPa. The depressurization is carried out at a speed of between 0.05 and 2 MPa per minute, preferably between 0.1 and 1 MPa per minute, and in a very preferred manner between 0.2 and 0.5 MPa per minute. The capacitor is next isolated from the circuit, and another capacitor is put on line. The temperature of this stage is between 20 and 100° C. and preferably between 20 and 80° C. This stage produces a hydrogen stream that is burned in the vapor reforming unit. The hydrogen stream can also be sent in a mixture with a portion of a hot hydrogen stream and saturated with water vapor, obtained after a flushing of the regenerated adsorber, which is burned in the vapor reforming unit.

Stage 3: The capacitor that is isolated in the preceding stage is next raised in pressure and in temperature with the feedstock of the process (natural gas) that is available at a boundary pressure of the unit and generally preheated to around 150° C. in the vapor reforming unit. The natural gas is heated around 300° C. by exchange with the water vapor before being sent to the adsorbent bed. The circulation of the hot natural gas in the capacitor makes it possible to reheat the adsorbent bed as well as the walls up to a temperature that is greater by at least 20° C. than the condensation temperature of the water vapor at the operating pressure (255° C. at 3.5 MPa), which will prevent any risk of condensation during the next stage. The pressure variation is the one that exists between the pressure of the hydrogen to be purified and the pressure of the available superheated water vapor. The recompression is carried out at a speed of between 0.05 and 4 MPa/minute, preferably between 0.1 and 1 MPa/minute, and preferably between 0.2 and 0.5 MPa/minute.

Stage 4: The adsorbent of the reheated capacitor is next regenerated by circulation of the vapor used at the input of the vapor reforming. The vapor makes possible the desorption of the impurities of the adsorbent ($CH_4$, primarily) and returns them into the vapor reforming reactor. The water vapor at the output of the capacitor is sent into an exchanger for reheating the natural gas that is intended for preheating. The pressure is between 1 and 10 MPa, preferably between 2 and 8 MPa, and very preferably between 1.5 and 4 MPa, and the temperature is between 20 and 400° C., and preferably between 50 and 300° C.

The gas velocity is between 0.5 and 20 m/minute, and preferably between 1 and 10 m/minute. The duration of the desorption phase is between 1 and 180 minutes, preferably between 1 and 30 minutes, and preferably between 1 and 15 minutes. The duration of the desorption phase can be selected in such a way that the temperature of the vapor at the adsorber output is greater than 5° C. at the dew point of the water vapor at the pressure under consideration. By proceeding thus, the risk of water condensation in the mesoporosity of the adsorbent is greatly limited.

Stage 5: The capacitor is next isolated and then flushed by pure and hot hydrogen to remove the vapor that is still present in the capacitor. The hot and water-vapor-saturated hydrogen is next sent partially to the burners of the vapor reforming furnace, and which is burned by the vapor reforming unit, and the rest of the mixture with the dilution water vapor to the gas turbine for producing electricity. Actually, the current turbines cannot operate on pure hydrogen, but could—according to one skilled in the art—operate by means of several adaptations with a mixture of 50% hydrogen and water vapor. The pressure is between 1 and 10 MPa, and preferably between 2 and 8 MPa, and the temperature is between 20 and 400° C., and preferably between 50 and 300° C. The velocity of the gas is between 0.5 and 20 m/minute and preferably between 1 and 10 m/minute. The duration of this purging phase is between 1 and 180 minutes, preferably between 1 and 30 minutes, and preferably between 1 and 15 minutes. The duration of this purging phase can be selected in such a way as to flush the adsorber with a gas volume of, for example, between 1 and 100 volumes of adsorber, and preferably between 2 and 50 volumes of adsorber.

Stage 6: The capacitor is cooled by flushing pure and cold hydrogen. The reheated hydrogen at the capacitor output is again reheated by exchange with the dilution vapor before being returned to Stage 5. The pressure is between 1 and 10 MPa, and preferably between 2 and 8 MPa, and the temperature is between 20 and 200° C., and preferably between 50 and 100° C. The velocity of the gas is between 0.5 and 20 m/minute, and preferably between 1 and 10 m/minute. The duration of the phase for cooling the adsorbent is between 1 and 180 minutes, preferably between 1 and 30 minutes, and preferably between 1 and 15 minutes. The gas that is used in this stage can be, for example, all or part of the purified hydrogen that is produced during Stage 1.

The addition of a phase for decompression or depressurization at an intermediate pressure in the cycle of the adsorption unit described above makes it possible:

- To reduce the recycled hydrogen flow rate, because the hydrogen that is collected during the decompression phase is directed to the burners at medium and/or low pressure. With this configuration being able to include a use that corresponds to a reforming of the conventional vapor operating with a unit for recovery of $CO_2$ in pre-combustion. In this case, the hydrogen stream can feed the burners of the furnaces that are used to provide the energy that is necessary to the reaction. This stream can preferably be finished by the hydrogen that is produced for limiting the carbon dioxide emissions. In addition, the reduction of the recycling flow rate makes it possible to reduce the size of the equipment such as the vapor reforming unit, the vapor conversion unit, and the amine unit, and it improves conversion into hydrogen.
- To maintain a satisfactory methane recycling flow rate that makes it possible to promote the vapor reforming equilibrium reaction in the forward direction
- To increase the net overall yield of the unit
- To obtain a $CO_2$ avoidance level that is greater than 90%
- To reduce by 0.8% the flow rate of feedstock natural gas while keeping the same turbine sizes.

Figure 6:
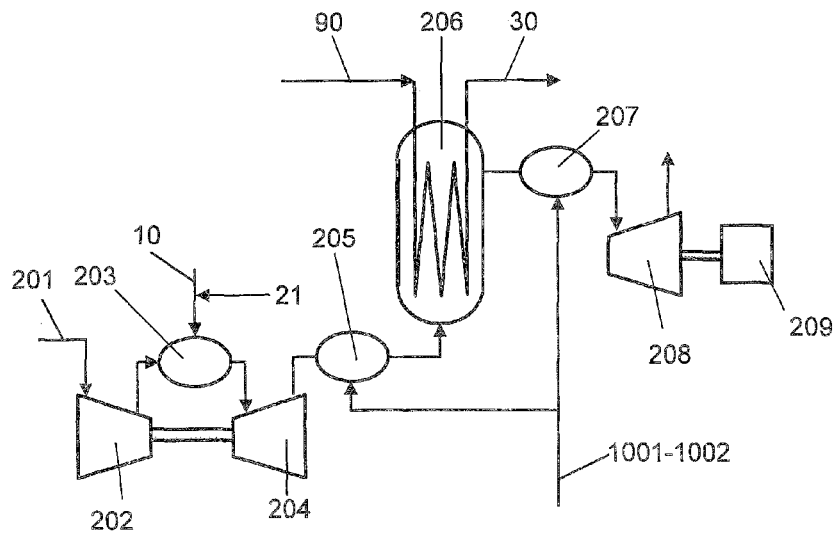
FIG. 6 shows one way of using the diagram for the production of hydrogen according to the invention.

FIG. 6 presents in detail an embodiment of the vapor reforming unit (11) by using the HyGenSys™ process (registered trademark) that means "Hydrogen Generation System," i.e., hydrogen production system. Here, this is a version of the process for co-production of hydrogen and electricity from natural gas that is suitable for recovery of $CO_2$ in pre-combustion.

The principle of this process has been described in the patent FR 2 852 358. HyGenSys™ is a process that combines a gas turbine and a compact reforming exchanger-reactor with the natural gas vapor. The specificity of the process is linked similarly; therefore, the heat is provided to the very endothermic reaction for reforming the natural gas.

The process is characterized by:
- The use of hot and pressurized flue gases that originate from a turbo-compressor without an alternator for heating an exchanger-reactor;
- A compact technology with an advanced thermal integration for the HyGenSys™ exchanger-reactor,
- Expansion turbine connected to an alternator (recovery expander) downstream from the HyGenSys™ reactor that produces electricity.

The preheated mixture (desulfurized natural gas+vapor) is introduced via the pipe (90) into the exchanger-reactor (206) that makes it possible to carry out the vapor reforming reaction that leads to the production of a synthetic gas via the pipe (30). The heat is provided by hot gases that originate from a gas turbine co-generation device. The process comprises a compression of the air that is introduced via the pipe (201) into a compression section (202), a first combustion stage in a combustion chamber (203) that is under pressure (for example, 1.8 MPa) between the compressed air and a hydrogen-rich mixture. The hydrogen-rich mixture that is obtained from the pipe (10) is diluted to 50% by volume, for example, with water vapor. After the stage of combustion with air, the mixture is next expanded in an expansion section (204) that consists of a turbine that is connected to the same shaft as the compressor. The expansion of the turbine provides the power that is necessary to the compressor; the output pressure of the turbine is on the order of 0.5 MPa; combustion is produced in the gas unit (205) at the output of the unit (204) and mixed with the hydrogen-rich gas that originates either from the pipe 10 in the case of FIG. 3 or pipe 1001 with a possible addition of hydrogen-rich gas of the pipe 1002 in the case of FIG. 6. The flow rate of the hydrogen-rich mixture is adjusted in such a way as to obtain a temperature on the order of 1260° C. at the output of this combustion chamber. The hot flue gases that are obtained provide the necessary heat to the exchanger-reactor (206). The flue gases that are cooled at the output of the section (206) are again reheated in the combustion chamber (207) by adding a hydrogen-rich stream that is obtained from the pipe (1001) with a possible addition of hydrogen-rich gas from the pipe (1002) coming from the pipe (10) (FIG. 2). The hydrogen that circulates in the pipe (1001) is low- or medium-pressure hydrogen; it may be advantageous to use an addition of hydrogen sent by the pipe (10) via the pipe (1002) to supply certain ramps of burners. In addition, in the event of using the HyGenSys™ process, it is possible to use either the pipe (1001) or the pipes (1001) and (1002) for supplying the combustion chambers (205, 207) (FIG. 6).

The flue gases are then sent into an expansion turbine (208) in such a way as to recover the expansion energy in the form of electricity via an alternator (209).

The HyGenSys™ process also makes it possible to facilitate the recovery of $CO_2$ for the purpose of its sequestration.

When this option is retained, a fraction of the hydrogen that is produced is used mixed with the water vapor as a fuel for supplying the turbine and the combustion chambers that are upstream and downstream from the exchanger-reactor.

The following examples illustrate a particular application of the invention.

EXAMPLES

Examples 1 and 2 are based on a use of the HyGenSys™ technology

Examples 1 and 2 produce on the order of 490 MWe from a combined cycle. The device that is used in these examples comprises:
- 4 Exchanger-reactors
- 4 Hot gas generators based on a modified SGT-700-type turbine for operating with a hydrogen-rich mixture. In this case of operation, only the shaft that is located between the air compressor and the expansion turbine at an intermediate pressure is used. The work of the expansion makes it possible to provide the necessary energy to the operation of the compressor.
- 4 Dresser-Rand (E-248)-type expansion turbines
- 1 Primary SGT5-4000-type turbine.

Examples 1 and 2 are carried out with the same turbines, which leads to slight variations of the flow rate of the natural gas that is introduced and electrical power recovered.

Example 1

According to the Prior Art

It is desired to produce 485 MWe using a combined cycle (gas turbine+recovery of heat on flue gases at the output of the turbine with production of vapor and vapor turbines) by using the HyGenSys™ technology.

Natural gas is used at 7 MPa and 10° C. of the following molar composition:

$CH_4$: 91%
$C_2H_6$: 6%
$C_3H_8$: 1%
$CO_2$: 2%

After the vapor reforming stages, vapor conversion and activated MDEA absorption, the gas that is produced has 2.65 MPa, 57° C., and its molar composition is as follows:

$H_2$: 92.8%
$CH_4$: 5.62%
CO: 0.95%
$CO_2$: 0.01%
$H_2O$: 0.62%

It is superheated by 5° C. to no longer be saturated and to prevent any condensation of water on the adsorbent.

The total flow rate of pure hydrogen supplying the turbines is 469,190 $Nm^3/h$ without an intermediate purging stage.

The flow rate of recycled pure hydrogen is 22,430 Nm3/h.

The heat that is necessary to the vapor reforming reaction is provided by the combustion flue gases in the exchanger-reactors.

The flow rate of natural gas is 114,800 $Nm^3/h$.

The vapor flow rate for the vapor reforming is 422,730 $Nm^3/h$.

The dilution vapor flow rate is 308,100 $Nm^3/h$.

The adsorption unit consists of 4 adsorption units in parallel, each comprising 5 capacitors.

In terms of overall performance, the overall energy yield is 40.6%.

The $CO_2$ recovery rate is then 98.1%.

Example 2

According to the Invention

It is desired to produce 490 MWe using a combined cycle (gas turbine+recovery of heat on the flue gases at the output of the turbine with production of vapor and vapor turbines) by using the HyGenSys™ technology.

Natural gas is used at 7 MPa and 10° C. of the following molar composition:

$CH_4$: 91%
$C_2H_6$: 6%
$C_3H_8$: 1%
$CO_2$: 2%

By proceeding according to this invention, after vapor reforming, the vapor conversion and activated MDEA absorption, the gas that is produced has 2.65 MPa, 57° C., and the molar composition according to the invention is as follows:

$H_2$: 94.3%
$CH_4$: 3.92%
CO: 1.14%
$CO_2$: 0.01%
$H_2O$: 0.63%

It is superheated by 5° C. so as to no longer be saturated and to prevent any condensation of water on the adsorbent.

The total flow rate of pure hydrogen that supplies the turbines is 431,690 $Nm^3/h$ or a reduction of 8% (relative to the comparison example) of which 26,760 $Nm^3/h$ is obtained from the intermediate purging stage described in this invention.

The flow rate of recycled pure hydrogen is 9,610 Nm3/h or a reduction of 57% (relative to the comparison example).

The heat that is necessary for the vapor reforming reaction is provided by the combustion flue gases in the exchanger-reactors.

The flow rate of natural gas is 113,930 $Nm^3/h$ (reduction of 0.8% relative to the comparison example).

The vapor flow rate for the vapor reforming is 400,990 $Nm^3/h$.

The dilution vapor flow rate is 302,190 $Nm^3/h$.

The adsorption unit that is used consists of 4 adsorption units (15) in parallel, each comprising 6 capacitors.

In terms of overall performance, the overall energy yield is 41.4%.

The $CO_2$ recovery rate is 93.5%; this value is greater than the objective of 90%.

The use of the process according to the invention with a decompression phase in the adsorption unit thus makes possible a gain of 2% relative to the use of the process according to the prior art.

This invention should not be limited to the details provided above and makes possible embodiments under numerous other specific forms without being removed from the field of application of the invention. Consequently, these embodiments should be considered by way of illustration and can be modified without, however, exceeding the scope defined by the attached claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application Ser. No. 10/03.089, filed 23 Jul. 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for the production of hydrogen from a hydrocarbon feedstock and water vapor that comprises:
    A stage for the production of a synthetic gas in a vapor reforming unit of the hydrocarbon feedstock in the presence of water vapor, with a fuel that provides the heat that is necessary to the reaction,
    A stage for conversion to vapor of the synthetic gas that is obtained in the preceding stage producing a hydrogen stream that contains methane and carbon dioxide,
    A stage for recovering carbon dioxide that is present in the stream that is obtained in the stage for conversion to vapor, making it possible to separate the carbon dioxide from the hydrogen stream,
    A stage for recovery and recycling to the vapor reforming of impurities that are present in the hydrogen stream, comprising a decompression phase that is carried out at a pressure of between 0.2 MPa and 1.4 MPa 1.4 MPa; and wherein the phase for decompression and regeneration of the adsorber is produced in the following way:

Isolation of the first adsorber and putting the second adsorber on line,

Decompression of the first adsorber, recompression and flushing of the first adsorber, with a hydrocarbon feedstock stream that is designed to serve as feedstock in the vapor reforming unit, and heated by exchange with the water vapor that is also intended for the vapor reforming unit, up to a temperature that is greater by at least 20° C. than the condensation temperature of the water vapor, Regeneration of the reheated adsorber and desorption of impurities by circulation of water vapor that is superheated by at least 20° C. intended for the vapor reforming unit, Elimination of the water vapor that is present in the adsorber that is regenerated by a flushing of the adsorber with a pure and hot hydrogen stream, Flushing of the adsorber from which water vapor is removed by a pure and cold hydrogen stream.

2. Process for the production of hydrogen according to claim 1, in which the stage for recovery and recycling of impurities is carried out in an adsorption unit that comprises at least two adsorbers and comprises at least the following successive phases:

Adsorption of impurities on the first adsorber,
Decompression and regeneration of the first adsorber,
Adsorption of impurities on the second adsorber.

3. Process for the production of hydrogen according to claim 1, in which the decompression phase is carried out at a temperature of between 20° C. and 100° C.

4. Process for the production of hydrogen according to claim 1, in which the decompression phase is carried out at a speed of between 0.05 MPa per minute and 2 MPa per minute.

5. Process for the production of hydrogen according to claim 1, in which the decompression phase produces a hydrogen stream that is burned in the vapor reforming unit.

6. Process for the production of hydrogen according to claim 1, in which the decompression phase produces a hydrogen stream that is sent in a mixture with a portion of a hydrogen stream that is hot and saturated with water vapor, obtained after the flushing of the regenerated adsorber, which is burned in the vapor reforming unit.

7. Process for the production of hydrogen according to claim 1, in which, at the end of the elimination of the water vapor, a portion of the hydrogen stream that is obtained and that is hot and saturated by water vapor is sent, which is burned in the reforming unit, and the other portion of the stream is sent in a mixture with the dilution water vapor to a gas turbine to produce electricity.

8. Process for the production of hydrogen according to claim 1, in which, at the end of the elimination of water vapor, a portion of the hydrogen stream that is obtained after the flushing of the regenerated adsorber is sent to an outside unit, while the rest of the hydrogen is used for the hot flushing and then sent to the burners of the reforming unit.

9. Process for the production of hydrogen according to claim 1, in which, at the end of flushing with cold hydrogen, the stream of reheated hydrogen that is obtained after the cooling phase of the adsorber is again reheated by exchange with the water vapor and used in the phase for elimination of the water vapor that is present in the adsorber.

10. Process for the production of hydrogen according to claim 1, in which the hydrocarbon feedstock is natural gas.

11. Process for the production of hydrogen according to claim 1, in which the adsorbed impurities are methane, carbon dioxide, and carbon monoxide.

12. Process for the production of hydrogen according to claim 1, in which the stage for production of synthetic gas is produced at a pressure of between 2.5 MPa and 3.5 MPa.

13. Process for the production of hydrogen according to claim 1, in which the stage for recovery of carbon dioxide is carried out in an amine unit that uses methyl diethylamine and at least one other amine.

* * * * *

UNITED STATES PATENT AND TRADEMARK OFFICE
CERTIFICATE OF CORRECTION

PATENT NO. : 8,784,516 B2
APPLICATION NO. : 13/187844
DATED : July 22, 2014
INVENTOR(S) : Beatrice Fischer et al.

Page 1 of 1

It is certified that error appears in the above-identified patent and that said Letters Patent is hereby corrected as shown below:

IN THE CLAIMS:

Column 14, Line 65 reads: "a pressure of between 0.2 MPa and 1.4 MPa 1.4 MPa;" should read
-- a pressure of between 0.2 MPa and 1.4 MPa; --.

Signed and Sealed this
Sixth Day of January, 2015

Michelle K. Lee
*Deputy Director of the United States Patent and Trademark Office*